Feb. 9, 1960   K. BERNINGHAUS   2,924,316
MACHINE TOOL, SUCH AS A MILLING MACHINE, PARTICULARLY
FOR THE CUTTING OF KEYS
Filed Feb. 9, 1956   3 Sheets-Sheet 1

INVENTOR
Karl Berninghaus
by Michael S. Striker
Agent

INVENTOR
Karl Berninghaus
by Michael S. Striker
Agent

United States Patent Office 2,924,316
Patented Feb. 9, 1960

2,924,316

MACHINE TOOL, SUCH AS A MILLING MACHINE, PARTICULARLY FOR THE CUTTING OF KEYS

Karl Berninghaus, Velbert, Rhineland, Germany, assignor to Robert Berninghaus & Söhne, Velbert, Rhineland, Germany, a firm Application February 9, 1956, Serial No. 564,554

6 Claims. (Cl. 192—25)

The present invention relates to a machine tool, particularly to a milling machine with several cutting tools, such as milling cutters, arranged one behind the other in the direction of feed. Such machines are used, for example, for working the variously notched edges of keys as required for controlling the tumblers of locks. In this connection it is essential to accurately maintain the relative positions of the various portions of said edges. Moreover, it is of primary importance for various portions of manufacturing the keys in an economical manner that the adjustment of the tools for machining the individual notches can be carried out quickly and accurately, because as a rule only a few keys are made with the same combination of tool adjustments, so that it is necessary to repeatedly change the adjustment in order to produce the large number of key variations essential for locks with a good safety factor. The known machines, in which several tools, such as milling cutters, successively cutting the individual control surfaces for the tumblers are arranged one following the other and axially displaced with respect to each other, are not capable of meeting these requirements in a satisfactory manner, because therein the setting of the tools causes waste of time and moreover considerable working tolerances must be allowed which detrimentally affect the accuracy of the keys. In these known arrangements the holders of the tools arranged one behind the other are adjustable in vertical direction for instance with the aid of threaded spindles cooperating with rotatable and axially immovable nuts and with locking means fixed on the machine. The turning of these nuts necessary for the adjustment is not only inconvenient but also requires the use of special tools, because the nuts are necessarily arranged close together because the tool holders must be closely spaced in order to keep the travel of the work holder reasonably short. There is also the disadvantage that any error in the adjustment of the nuts has the direct effect of causing a dimensional deviation in the relative positions of the machined notches of the keys. Even when the apparatus is carefully operated, considerable dimensional deviations are unavoidable, partly also due to wear of the adjustment means in the course of extended use.

A main object of the invention is to provide a machine tool of the type described, in which the accuracy of the work is practically independent of careful manipulation on the part of the operator and in which the adjustment of the tools can be carried out quickly and easily.

It is another object of the present invention to provide a machine tool of the type set forth in which one or more machining tools can be displaced selectively so as to move into predetermined operating positions, and wherein preferably the displacement of the machining tools is effected mechanically with the operator only having to operate the selector means whereafter the mechanism moves the respective tool into the selected operating position.

It is still another object of the present invention to provide for a clutch mechanism by means of which the amount of angular turn desired to be carried out by the driven element after engagement of the clutch can be selectively predetermined.

With the above objects in view, a preferred form of a machine tool having at least one machining tool movable between different operating positions and embodying the invention, comprises, in combination, tool displacing means movable between different selected positions for moving said machining tool to a selected operating position depending upon the position of said tool displacing means, moving drive means for actuating and thereby moving said tool displacing means into one of the selected positions thereof, and a plurality of clutch means for selectively coupling the drive means with the tool displacing means for actuating the latter, each of the clutch means constructed so as to connect the drive means with the tool displacing means for a selected time period different from the time periods characteristic of the other clutch means whereby the amount of movement of the tool displacing means is determined by the particular clutch means operated.

In another aspect of the invention, a preferred form of a clutch mechanism for connecting a driving member to a member to be driven and embodying the invention, comprises, in combination, a rotary driving member having a clutch-engaging face, at least one clutch member fixedly connected to a member to be driven for rotation therewith and having surface portions located opposite said face of said driving member, said clutch member including a plurality of independent clutch means mounted adjacent to said surface portions and individually movable between an inoperative position and an operative position in which said clutch means project from said surface portions for engagement with said clutch-engaging face of said driving member, said clutch means being respectively offset angularly against each other in the direction of rotation and each having a portion moving on a predetermined circular path when in operative position; and stationary disengagement means located in the circular path of the portions of the clutch means for engaging at a predetermined point of their rotational movement any one of the clutch means being in operative position, so that after selectively moving one of the clutch means into operative position the driven member is caused to carry out a turn of a preselected angular magnitude depending upon the angular distance between the position of the particular clutch means when moved into operative position, and the position of the disengagement means. Deriving the mechanical work necessary for the adjustment of the tools from a driving means already results in a considerable saving in work for the operator of the machine. Furthermore, an advantage is derived from the fact that the tool displacing means are few simple parts so that the actual movement of the tool for adjustment is accurate within close tolerances. The use of a common driving means for a plurality of tool displacing means, has the advantage that the entire structure of the machine is simple and only requires few separate parts. Moreover, the operation of the machine is very economical. Since the driving means actuating the tool displacement means may operate continuously no complicated switching or control means or the like, tending to be subject to wear, are required.

To utilize to the full extent the working speed attainable by the machine, it has been found advantageous, according to another feature of the invention, to coordinate switching means to the carriage carrying the workpiece at both ends of its guide path. These switching means allow alternate forward and reverse working. Such an arrangement can be used to advantage for machines which have a different adjustment of the tool -holders, because the idle return motion of the tool carriage which was hitherto unavoidable, will be saved. Furthermore, it is recommended to equip the machine with a clamping device which has a spring loaded clamping member capable of being moved into its open position by abutments, so that the operator merely has to introduce the workpieces into the open clamping device, to select the tool position, and at the end of the travel to remove the workpieces from the clamping device which is again open. Such clamping devices can be made particularly simple if an elbow lever system disengageable by stops fixed on the machine is provided.

A preferred embodiment of the invention is illustrated by way of example in the accompanying drawings, in which.

Figure 2:
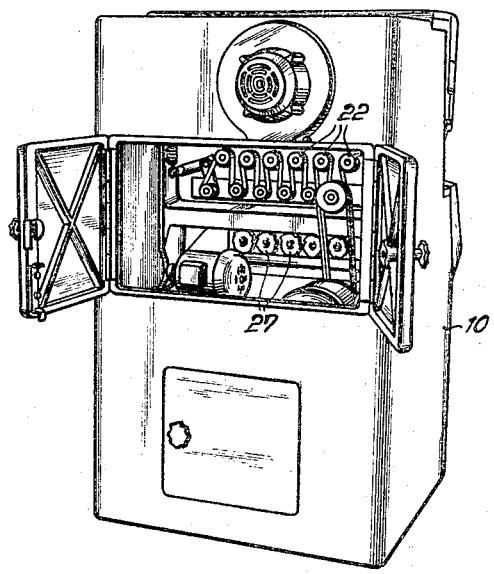
Fig. 2 is a similar view of the driving parts of the machine which are of importance for the invention.
Figure 3:
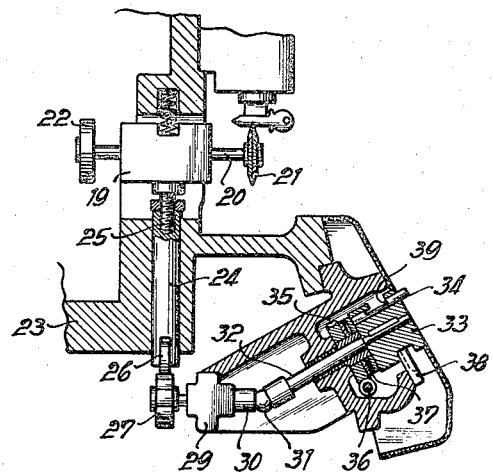
Fig. 3 is a vertical section through selecting and tool displacing arrangements of the machine.
Figure 4:
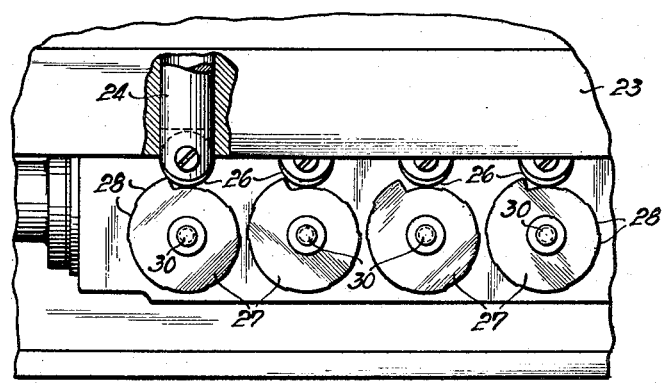
Fig. 4 is a fragmentary front elevation of the tool displacing arrangements.

A carriage 12 is shiftable on a guide rail 11 on the front part of a machine frame 10. This carriage 12 is driven by a so-called brake motor preferably equipped with a magnetic brake, through the intermediary of gears, with a pinion engaging a toothed rack extending along the length of the carriage but not shown in the drawings. A clamping device 13 for flat keys is arranged on the under side of the carriage and into which the keys to be cut are inserted, for example, in packs of three. The clamping device 13 is under the action of a spring accommodated in a housing 14 and is releasable with the aid of an elbow lever system 15 which is controlled by a spring-loaded lever 16 through the intermediary of a shaft, vertically traversing the carriage 12, and abutments or stops 17 adjustable on a rod 18 mounted on the machine frame. The carriage 12 also actuates limit switches which limit its movement, that may be started by press-button switches or foot switches, a slow-down path being practically eliminated thanks to the use of a driving motor provided with braking means. Six tool carriers 19 are accommodated in the machine frame below the guide rail 11 and are adjustable vertically independently of each other and each carries a work shaft 20 with a milling cutter 21. The work shafts 20 are axially adjustable relatively to their carriers 19 in known manner so that the staggering, that is the spacing of the parallel working planes of the tools can be changed. The work shafts 20 carry on their rear ends illustrated in Fig. 2, pulleys 22 over which a common driving belt is guided in known manner, which is kept taut by an arrangement of tensioning rollers or pulleys. The tool carriers 19 each rest on a slide 24 longitudinally movable in a guide 23 fixed on the housing, screw members 25 allowing vertical displacement which is provided for adjusting the depth of cut or for taking into consideration the diameter of the tool. The slides 24 are provided at their lower end with supporting rollers or cam followers 26 which bear against the periphery of cam disks 27 serving as tool displacing means. The cam disks 27 illustrated particularly in Fig. 4, have evenly spaced along their peripheries circular operative segments 28, the radii of which differ from each other by an amount equal to the height of the smallest pitch differential of the notches of the keys to be cut. The cam disks 27 are exchangeably mounted on shafts 30 journalled in a rail 29 rigid with the housing and are coupled by means of universal joints 31 to shafts 32 carrying clutch drums 33 on their outer ends. In these drums 33 slides or pins 34, movable parallel to the shafts 32, are evenly spaced around the circumference. Worm wheels 35 are mounted coaxially with, and rotatably on, the shafts 32, which wheels mesh with a common continuously driven worm 36. The worm wheels 35 are provided on one of their side faces with one or more radially disposed and angularly spaced notches 37 and the ends of the slides 34 directed towards these side faces are adapted to cooperate with the notches 37 to form a rotary clutch. When any one of the slides 34 is moved into engagement with the notched face of the pertaining wheel 35, a driving force is transmitted to the shaft 30 from the worm 36 via worm-wheel 35, the shoulder of a notch 37, the engaging slide or pin 34, clutch drum 33 and shaft 32. For automatically moving a depressed slide 34 back into its initial position, that is to disengage the clutch, a stationary abutment 38 with an inclined face 38′ is provided so that, and onto this abutment a depressed slide rides with a shoulder 39 formed by a lateral recess 101, so as to bring the slide 34 back into its initial position.

Figure 1:
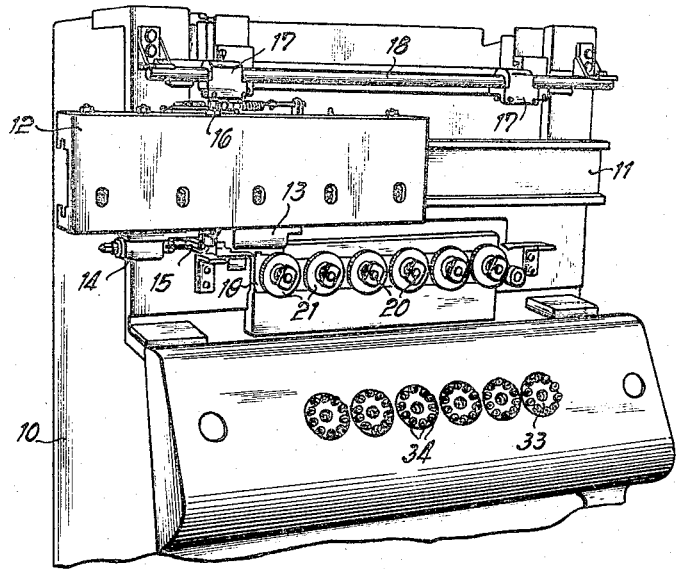
Fig. 1 is a front elevation of the principal part of a key milling machine.
Figure 5:
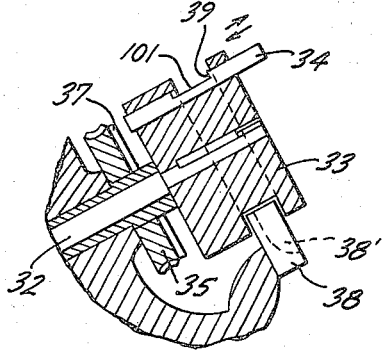
Figs. 5 and 6 show details of the device of Fig. 3 on an enlarged scale.
Figure 6:
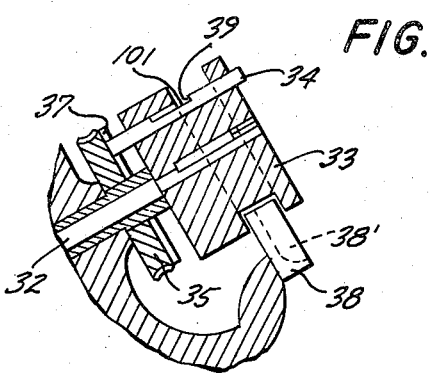

Fig. 5 shows the slide or clutch pin 34 in inoperative position, its outer end projecting for being manually operated so as to cause its opposite end to engage a radial notch or groove 37 of the wheel 35. Fig. 6 shows the slide 34 in its depressed or operative position of engagement. It is to be understood that for the sake of clarity only one slide 34 is shown while actually a plurality of such slides are arranged along a circle in the clutch drum 33 as can be seen in Fig. 1.

Figs. 5 and 6 also show that the drum 33 is provided with an annular groove substantially in line with a cutout 101 of the pins or slides 34 when the latter are in inoperative position as shown in Fig. 5. A stationary abutment member 38 projects into the annular groove and into the cutouts 101 so that the drum 33 with its slides 34 could be rotated freely without interference from the member 38, provided that all slides 34 were in inoperative position. However, if one of the slides 34 is moved into the operative position of Fig. 6 so that by engagement with the wheel 35 the drum 33 is caused to rotate then, after a certain turn of the latter, the shoulder 39 of the depressed slide 34 will run up against the bevelled edge 38′ of the abutment whereby this particular slide is automatically returned to inoperative position and disengaged.

The machine is operated in the following manner: A key or a pack of several keys to be worked is placed in the clamping device. The milling cutters 21 are then started, whereupon the motor effecting the feed of the carriage 12 is switched on. The carriage 12 with the clamped workpiece now runs over all the cutters in succession. The workpiece is thereby provided with notches the depth of which is determined by the vertical adjustment of the individual tools. This adjustment is effected for each tool by depressing one of the slides 34 distributed around the circumference of the associated drum 33. The depressed slide 34, by engaging with its tip any one of the notches 37 in the worm wheel 35, actuates a rotary clutch so that the drum 33 and, through the intermediary of the shaft 32, the joint 31 and the shaft 30, also the cam disk 27 is driven. The amount of the displacement of the particular tool is determined by the fact that the depressed slide 34 after engaging a notch 37 turns the drum 33 and thereby the pertaining disc 27 until, establishing the clutch, on reaching the abutment 38 provided with an inclined face 38′, the slide 34 is returned into its initial position, thereby disengaging the clutch. The amount of turn of the disc 27 depends upon the angular distance between the position of the particular slide 34 moved into engagement with wheel 35, and the position in which it meets the abutment 38 and is disengaged. No exacting requirements of accuracy is required for limiting the angular movements of the drums 33, because to each displacement position of a tool corresponds a comparatively great circumferential segment 28 of disc 27 the range of which segment a certain error in the angular position of the disc 27 does not affect the correctness of the position of the tool. The cam disk 27 consequently shifts the tool holder 19 upwards in response to the actual angle of rotation of the drum 33, the displacement path being dependent upon the angular distance of the particular selected slide 34 actually depressed from the stationary abutment 38 fixed on the machine and effecting the return movement thereof. The selection of the positions of the tools according to the actual tumbler combination can be carried out simply and quickly with the arrangement according to the invention, because it is merely necessary to push in each case one of the existing slides which are preferably numbered. As the selecting arrangements can, moreover, be arranged at a distance from the cutting tools, it is possible to commence the resetting of the tools for the next workpiece while the preceding workpiece is still moving, providing each machining operation is carried out according to the invention either during the forward or the return travel of the work carrier 12, or alternatingly during either one of these travels.

The form of construction illustrated is, as has already been stated, only an example of the application of the invention, which is not restricted to this form of construction. Many other constructions and modifications are possible. The principle on which the invention is based can be applied for cutting other keys or workpieces. Many modifications can also be made in the arrangement and shape of the parts. As machining tools, instead of milling cutters, grinding wheels might, for example, be employed. The slides 34 may be moved by electric means instead of being operated manually. In the event of it not being possible to carry out the cutting in a single pass, either the carriage 12 carrying the workpieces or the whole tool head 23 as a whole can be displaced. While a common drive for a plurality of tool displaying means is preferable, separate individual drives may be used as well.

It will be understood that each of the elements described above, or two or more together, may also find a useful application in other types of machine tools and clutches differing from the types described above.

While the invention has been illustrated and described as embodied in machine tools having at least one machining tool movable between different operating positions and in a clutch mechanism for connecting a driving member to a member to be driven, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool having at least one machining tool movable between different operating positions, in combination, tool displacing means movable between different selected positions for moving said machining tool to a selected operating position depending upon the position of said tool displacing means; moving drive means for actuating and thereby moving said tool displacing means into one of said selected positions thereof; clutch means and a plurality of clutch actuating means for selectively coupling said drive means with said tool displacing means for actuating the latter, each of said clutch actuating means constructed so as to connect said drive means with said tool displacing means for a selected time period different from the time periods characteristic of the other clutch actuating means whereby the amount of movement of said tool displacing means is determined by the particular clutch actuating means operated.

2. In a machine tool having a plurality of independent machining tools each movable between different operating positions, in combination, a plurality of independent tool displacing means respectively associated with said independent machining tools and movable between different selected positions for moving the associated machining tool to a selected operating position depending upon the position of said associated tool displacing means; moving drive means for actuating and thereby moving said tool displacing means independently from each other into one of said selected positions thereof; a plurality of clutch means each respectively associated with one of said tool displacing means for selectively coupling said drive means with said associated tool displacing means for actuating the latter and a plurality of clutch actuating means associated with each of said clutch means, each of said clutch actuating means associated with one of said clutch means constructed so as to connect said drive means with said associated tool displacing means for a selected time period different from the time period characteristic of the other clutch actuating means associated with the particular tool displacing means whereby the amount of movement of said particular tool displacing means is determined by the particular clutch actuating means operated.

3. In a machine tool having at least one machining tool movable between different operating positions, in combination, tool displacing means movable between different selected positions for moving said machining tool to a selected operating position depending upon the position of said tool displacing means; cam means turnable into angularly differing positions for actuating and thereby moving said tool displacing means into different positions respectively associated with said angularly differing positions of said cam means; moving drive means for turning said cam means into a selected angular position for actuating and thereby moving said tool displacing means into one of said selected positions thereof; clutch means, and a plurality of clutch actuating means for selectively coupling said drive means with said cam means for actuating said tool displacing means, each of said clutch actuating means constructed so as to connect said drive means with said cam means for a selected time period different from the time periods characteristic of the other clutch actuating means whereby the amount of movement of said tool displacing means is determined by the particular clutch actuating means operated.

4. In a machine tool having a plurality of independent machining tools each movable between different operating positions, in combination, a plurality of independent tool displacing means respectively associated with said independent machining tools and movable between different selected positions for moving the associated machining tool to a selected operating position depending upon the position of said associated tool displacing means; a plurality of independent cam means respectively associated with said tool displacing means and turnable into angularly differing positions for actuating and thereby moving the associated tool displacing means into different positions respectively associated with said angularly differing positions of the associated cam means; moving drive means for turning each of said cam means into a selected angular position for actuating and thereby moving said associated tool displacing means into one of said selected positions thereof; a plurality of clutch means each respectively associated with one of said cam means for selectively coupling said drive means with said associated cam means for actuating said associated tool displacing means and a plurality of clutch actuating means associated with each of said clutch means, each of said clutch actuating means associated with one of said clutch means constructed so as to connect said drive means with said associated cam means for a selected time period different from the time periods characteristic of the other clutch actuating means associated with the particular cam means whereby the amount of movement of said particular tool displacing means is determined by the particular clutch actuating means operated.

5. In a machine tool having at least one machining tool movable between different operating positions, in combinatoin, tool displacing means movable between different selected positions for moving said machining tool to a selected operating position depending upon the position of said tool displacing means; cam means in operative engagement with said tool displacing means and turnable into angularly differing positions for actuating and thereby moving said tool displacing means into different positions respectively associated with said angularly differing positions of said cam means, said cam means including a disc having a plurality of circular operative segments differing from each other by their respective radii and becoming operative after a selected angular turn of said cam means; moving drive means for turning said cam means into a selected angular position for actuating and thereby moving said tool displacing means into one of said selected positions thereof; clutch means and a plurality of clutch actuating means for selectively coupling said drive means with said cam means for actuating said tool displacing means, each of said clutch actuating means constructed so as to connect said drive means with said cam means for a selected time period different from the time periods characteristic of the other clutch actuating means whereby the amount of said angular turn of said cam means and thereby the amount of movement of said tool displacing means is determined by the particular clutch actuating means operated.

6. In a machine tool having a plurality of independent machining tools each movable between different operating positions, in combination, a plurality of independent tool displacing means respectively associated with said independent machining tools and movable between different selected positions for moving the associated machining tool to a selected operating position depending upon the position of said associated tool displacing means; a plurality of independent cam means respectively associated with said tool displacing means and in operative engagement therewith, said cam means being turnable into angularly differing positions for actuating and thereby moving the associated tool displacing means into different positions respectively associated with said angularly differing positions of the associated cam means, said cam means each including a disc having a plurality of circular operative segments differing from each other by their respective radii and becoming operative after a selected angular turn of said cam means; moving drive means for turning each of said cam means into a selected angular position for actuating and thereby moving said associated tool displacing means into one of said selected positions thereof; a plurality of clutch means each associated with one of said cam means for selectively coupling said drive means with said associated cam means for actuating said associated tool displacing means and a plurality of clutch actuating means associated with each of said clutch means, each of said clutch actuating means associated with one of said clutch means constructed so as to connect said drive means with said associated cam means for a selected time period different from the time periods characteristic of the other clutch actuating means associated with the particular cam means whereby the amount of said angular turn of said cam means and thereby the amount of movement of said particular tool displacing means is determined by the particular clutch actuating means operated.

References Cited in the file of this patent

UNITED STATES PATENTS

| | | |
|---|---|---|
| 1,630,816 | Wilcox | May 31, 1927 |
| 1,878,523 | Johnson | Sept. 20, 1932 |
| 1,925,723 | Long | Sept. 5, 1933 |
| 1,952,355 | Belshaw | Mar. 27, 1934 |
| 2,520,013 | Rafter | Aug. 22, 1950 |
| 2,645,978 | Sejarto et al. | July 21, 1953 |
| 2,682,809 | May | July 6, 1954 |